United States Patent
Harnisch

[11] 4,018,796
[45] Apr. 19, 1977

[54] MONOMETHINE DYESTUFFS

[75] Inventor: Horst Harnisch, Cologne-Buchheim, Germany

[73] Assignee: Bayer Aktiengesellschaft, Leverkusen, Germany

[22] Filed: Mar. 17, 1975

[21] Appl. No.: 558,647

[30] Foreign Application Priority Data

Mar. 20, 1974 Germany .......................... 2413371

[52] U.S. Cl. .......................... 260/343.2 R; 8/2.5 R; 8/76; 260/240 R; 260/247.2 B; 260/293.58; 260/295 F; 260/326.1; 260/326.34

[51] Int. Cl.² ...................................... C07D 311/06

[58] Field of Search ............................ 260/343.2 R

*Primary Examiner*—Anton H. Sutto
*Attorney, Agent, or Firm*—Plumley and Tyner

[57] ABSTRACT

The invention relates to monomethine dyestuffs of the formula

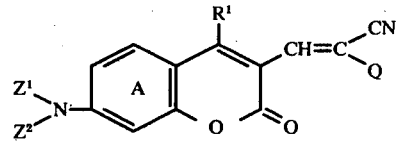

wherein
$Z^1$ is alkyl, cycloalkyl, aralkyl or aryl
$Z^2$ is hydrogen or $Z^1$
Q is CN, $COOR^2$ or $CONR^3R^4$,
$R^1$u.$R^4$ is hydrogen or alkyl,
$R^2$ is alkyl, alkenyl, aralkyl, cycloalkyl or aryl and
$R^3$ is alkyl, cycloakyl, aralkyl, aryl or acyl.

The dyestuffs are suitable for the dyeing of natural and synthetic fibers, which are dyed in orange or red shades with high brilliancy.

5 Claims, No Drawings

MONOMETHINE DYESTUFFS

The invention relates to monomethine dyestuffs of the general formula

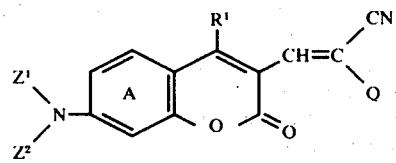

wherein $Z^1$ represents alkyl, cycloalkyl, aralkyl, aryl or a 2- or 3-membered alkylene radical connected to the 6-position of the coumarin ring, $Z^2$ represents hydrogen, alkyl, cycloalkyl, aralkyl or a 2-membered or 3-membered alkylene radical connected to the 8-position of the coumarin ring, $R^1$ represents hydrogen or alkyl, Q represents CN, $COOR^2$ or $CONR^3R^4$, $R^2$ represents alkyl, alkenyl, aralkyl, cycloalkyl or aryl, $R^3$ represents alkyl, cycloalkyl, aralkyl, aryl or acyl, and $R^4$ represents hydrogen or alkyl and wherein $Z^1$ and $Z^2$, and $R^3$ and $R^4$, conjointly with the N atom by which they are linked, can represent the remaining members of an optionally benz-fused heterocyclic ring which, like the ring A, the alkyl, aralkyl, cycloalkyl, aryl and acyl radicals mentioned can carry further radicals customary in dyestuff chemistry, and to processes for their preparation and to their use as dyestuffs.

By "substituents customary in dyestuff chemistry" there are to be understood, in addition to sulpho groups and carboxylic acid groups and cyclic or non-cyclic ammonium radicals, above all non-ionic radicals as mentioned in the explanations which follow. Thus, possible alkyl radicals $Z^1$ and $Z^2$ are, in particular, those with 1 to 6 C atoms which can also be interrupted by —O—, such as methyl, ethyl, n-propyl, β-methoxyethyl, β-ethoxyethyl, β-n-butoxyethyl, n-butyl, isobutyl, n-pentyl and n-hexyl. $C_1$–$C_4$-alkyl radicals optionally interrupted by —O— can in addition carry two or preferably one substituent, such as, for example, hydroxyl; halogen, such as chlorine and romine; nitrile; $C_1$–$C_4$-alkoxycarbonyl, such as methoxycarbonyl, ethoxycarbonyl, β-methoxycarbonyl, β-ethoxyethoxycarbonyl, n-propoxycarbonyl or n-butoxycarbonyl; benzyloxycarbonyl; phenoxycarbonyl; aminocarbonyl or aminosulphonyl, which can also be substituted by one or two $C_1$–$C_4$-alkyl radicals, such as, for example, the radical $CH_3O—CH_2—NH—CO—CH_2—CH_2—$; phenoxy which is optionally substituted by cyclohexyl, one or two $C_1$–$C_4$-alkyl or one to five chlorine atoms; phenyl-$C_1$–$C_3$-alkoxy, such as benzyloxy; phenoxy-$C_1$–$C_3$-alkoxy; cyclohexyloxy; cycloalkyl, such as cyclohexyl or cyclopentyl; $C_1$–$C_4$-alkylsulphonyl such as methylsulphonyl or 3-chloro-n-propylsulphonyl; benzylsulphonyl; phenylsulphonyl which is optionally substituted by $C_1$–$C_4$-alkyl or chlorine; acyloxy, preferably $C_1$–$C_4$-alkylcarbonyloxy, benzylcarbonyloxy, benzoyloxy, $C_1$–$C_4$-alkoxycarbonylbenzoyloxy, $C_1$–$C_4$-alkoxycarbonyloxy, benzyloxycarbonyloxy, phenoxycarbonyloxy, carbamoyl-benzoyloxy, phenylaminocarbonyloxy, aminocarbonyloxy, $C_1$–$C_4$-alkylaminocarbonyloxy, N-tri-($C_1$–$C_4$-oxycarbonylethyl)-N-tri-($C_1$–$C_4$-alkyl)ammonium salt and oxycarbonylethyl-N-pyridinium salt; acylamino or N-$C_1$–$C_2$-alkyl-acylamino such as $C_1$–$C_4$-alkylcarbonylamino, $C_1$–$C_4$-alkylsulphonylamino, benzylcarbonylamino, benzoylamino, N-benzoyl-N-methylamino, phenylaminocarbonylamino, phenylsulphonylamino, toluenesulphonylamino, dichlorotriazinylamino, phthalimido, maleimido and succinimido; an amino group which is optionally substituted by one or two $C_1$–$C_4$-alkyl, by phenyl, by phenyl and $C_1$–$C_2$-alkyl or by benzyl; tri-($C_1$–$C_4$-alkyl)-ammonium (halide); phenylmercapto, which can also be substituted by one or two $C_1$–$C_4$-alkyl and/or one to five chlorine atoms; benzthiazolyl-(2)-mercapto; benzoxazolyl-(2)-mercapto and benzimidazolyl-(2)-mercapto; carboxyl; sulpho; a 5-membered or 6-membered heterocyclic ring containing a quaternary N atom, such as 4-methyl-1,2,4-triazolium-(1) (methosulphate) or pyridinium (halide).

Suitable cycloalkyl radicals $Z^1$, $Z^2$, $R^2$ and $R^3$ are preferably the cyclohexyl and cyclopentyl radical.

Possible aralkyl radicals $Z^1$, $Z^2$, $R^2$ and $R^3$ are in particular phenyl-$C_1$–$C_5$-alkyl radicals, preferably phenyl-$C_1$–$C_3$-alkyl radicals, which can also be substituted by $C_1$–$C_4$-alkyl, chlorine, nitrile or $C_1$–$C_2$-alkoxy in the phenyl ring; benzyl, α- and β-phenylethyl and phenyl-n-propyl radicals are particularly preferred.

An aryl radical $Z^1$, $R^2$ or $R^3$ is preferably to be understood as the phenyl radical. Preferred heterocyclic, optionally benz-fused rings, which can be formed by $Z^1$ and $Z^2$ conjointly with the N atom by which they are linked, are 5-membered or 6-membered N-heterocyclic structures such as pyrrolidine, piperidine, morpholine, piperazine, N-$C_1$–$C_4$-alkylpiperazine and pyrazoline, and, as a benz-fused heterocyclic structure, isoindoline.

A 2- or 3-membered alkylene chain $Z^1$ connected to the 6-position of the coumarin ring, and/or an alkylene chain $Z^2$ connected to the 8-position can additionally carry substituents, especially $C_1$–$C_3$-alkyl groups, preferably methyl groups. Ethylene, 1,3-propylene and the radical

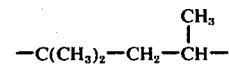

may be mentioned as examples. The ring A can in particular be substituted, preferably monosubstituted, by chlorine, alkyl or alkoxy.

Alkyl radicals in the ring A are preferably unsubstituted $C_1$–$C_3$-alkyl radicals or correspond to the formula —$CH_2$—G, wherein G represents chlorine, sulpho, a primary, secondary or tertiary amino group, quaternary ammonium group or acylamino group, a N-bonded cyclic carboxylic acid amide or 1,2-dicarboxylic acid amide, or a N-bonded 5-membered or 6-membered, optionally benz-fused N-heterocyclic structure, which can also contain 1 or 2 further hetero-atoms and/or a quaternary ammonium group as ring members.

Preferred radicals G are N,N-di-($C_1$–$C_4$-alkyl)amino, N-piperidinyl, N-morpholinyl, N-pyrrolidinyl, N'-$C_1$–$C_4$-alkyl-N-piperazinyl, N-phthalimidyl, N-succinimidyl, N-maleimidyl, N-di-chloromaleimidyl, N- pyrrolid-2-onyl, N-piperid-2-onyl, N-perhydroazepin-2-onyl, N-pyridinium, N-tri-($C_1$–$C_4$-alkyl)ammonium, N-$C_1$–$C_4$-alkyl-N-piperidinium, -morpholinium, pyrrolidinium, N,N-di-($C_1$–$C_4$-alkyl)-piperazinium, chloroacetamino, carbamoylmethylpyridinium chloride, carbamoyl-methyl-tri-($C_1$–$C_4$-alkylammonium chloride, chloromethyl or sulphomethyl radicals. Alkyl radicals $R^1$ preferably have 1 to 3 C atoms; methyl is particularly preferred.

Possible alkyl radicals $R^2$ are straight-chain or branched alkyl radicals with 1 to 8 C atoms, which can also be interrupted by —O—, such as methyl, ethyl, n-propyl, isopropyl, n-butyl, isobutyl, tertiary butyl, isoamyl, n-hexyl, 2-ethyl, n-butyl, n-octyl, $\beta'$-methoxyethyl, $\beta$-ethoxyethyl, $\beta$-n-propoxyethyl, $\beta$-isopropoxyethyl and $\beta$-n-butoxyethyl. $C_1$–$C_4$-alkyl radicals $R^2$ which are optionally interrupted by —O— can additionally carry substituents such as, for example, hydroxyl; halogen, such as chlorine and bromine; nitrile; carboxyl; sulpho; $C_1$–$C_2$-alkoxycarbonyl, carbamoyl, phenoxy, phenyl-$C_1$–$C_3$-alkoxy, phenoxy-$C_1$–$C_3$-alkoxy, cyclohexyloxy, cyclohexyl, di-($C_1$–$C_4$-alkyl)amino, N-tri-($C_1$–$C_4$-alkyl)ammonium, N-morpholinyl, N-piperidinyl, N-piperazinyl, N-pyrrolidinyl, N-$C_1$–$C_4$-alkyl-N-morpholinium, N-piperidinium and N-pyridinium. The preferred alkenyl radical $R^2$ is the allyl radical.

By alkyl radicals $R^3$ there are in particular to be understood $C_1$–$C_4$-alkyl groups which can be substituted by $C_1$–$C_4$-alkoxy; hydroxyl; halogen, such as chlorine and bromine; nitrile; $C_1$–$C_2$-alkoxycarbonyl, $C_1$–$C_4$-alkylamino, di-($C_1$–$C_4$-alkyl)amino and N-tri-($C_1$–$C_4$-alkyl)ammonium.

Alkyl radicals $R^4$ are, in particular, C–$C_4$-alkyl groups which can be substituted by $C_1$–$C_4$-hydroxyl, nitrile, chlorine or bromine.

Possible acyl radicals are, in addition to acetyl and methylsulphonyl, in particular acyl radicals of carbonic acid, preferably carbamoyl radicals, which can be N-methyl- or N-phenyl-substituted.

A preferred group of monomethine dyestuffs within the scope of the general formula I corresponds to the formula

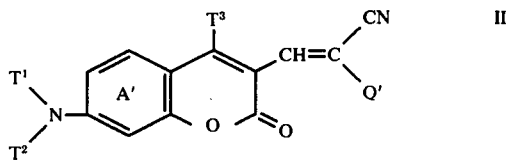

wherein $T^1$ and $T^2$ each by itself represents an unsubstituted $C_1$–$C_5$-alkyl radical which is optionally interrupted by —O—, a $C_1$–$C_4$-alkyl radical which is preferably monosubtituted or disubstituted by hydroxyl or chlorine or preferably monosubstituted by bromine, nitrile, $C_1$–$C_4$-alkoxycarbonyl, aminocarbonyl, phenoxy, benzyloxy, cyclohexyloxy, cyclohexyl, $C_1$–$C_4$-alkoxycarbonyloxy, $C_1$–$C_4$-alkylcarbonyloxy, acetylamino, $C_1$–$C_4$-alkylsulphonylamino, aminocarbonyloxy, di-($C_1$–$C_4$-alkyl)amino, COOH or $SO_3H$, or represents cyclohexyl, phenyl-$C_1$–$C_3$-alkyl or a 2-membered or 3-membered alkylene radical connected to the 6- or 8-position of the coumarin ring; or one of the radicals $T^1$ or $T^2$ represents hydrogen or a $C_1$–$C_4$-alkyl radical which is optionally interrupted by —O— and is substituted by benzyloxycarbonyl, phenoxycarbonyl, phenoxy substituted by 1–5 chlorine atoms, $C_1$–$C_4$-alkylsulphonyl, benzylsulphonyl, phenylsulphonyl, benzylcarbonyloxy, benzoyloxy, $C_1$–$C_4$-alkoxycarbonylbenzoyloxy, phenoxycarbonyloxy, tri-($C_1$–$C_4$-alkyl)ammonium, pyridinium, phthalimido, maleimido, succinimido, benzoylamino, phenylaminocarbonylamino, phenylsulphonylamino or toluenesulphonylamino, or $T^1$ and $T^2$ together with the shared N atom represents the remaining members of a piperidine, morpholine, piperazine, pyrrolidine or isoindoline ring, $T^3$ represents hydrogen or methyl, $Q'$ represents CN or COOR and R represents $C_1$–$C_6$-alkyl, or represents a $C_1$–$C_4$-alkyl radical which is substituted by hydroxyl, $C_1$–$C_4$-alkoxy, nitrile, chlorine, bromine, benzyloxy, phenoxy, cyclohexyloxy, di-($C_1$–$C_4$-alkyl)amino, N-tri-($C_1$–$C_4$-alkyl)ammonium, N-morpholinyl, N-piperidinyl N-pyridinium or phenyl, or represents allyl, cyclohexyl or phenyl, and wherein the ring $A'$ can additionally be substituted by methoxy, methyl or chloromethyl.

Particularly preferred radicals $T^1$ are unsubstituted $C_1$–$C_5$-alkyl radicals, $\beta$-cyanoethyl, $\beta$-methoxyethyl, $\beta$-ethoxyethyl, $\beta$-n-butoxyethyl, $\beta$-chloroethyl, $\beta$-bromoethyl, $\beta$-carbamoylethyl, $\beta$-methoxycarbonylethyl, $\beta$-ethoxycarbonylethyl, $\beta$-methoxycarbonylethyl, $\beta$-hydroxyethyl, $\beta$-acetoxyethyl, $\beta$-benzoyloxyethyl, $\beta$-benzyloxyethyl, $\beta$-cyclohexyloxyethyl, $\beta$-phenoxyethyl optionally substituted by 1–5 chlorine atoms, benzyl, $\alpha$-phenylethyl, $\beta$-phenylethyl, $\gamma$-phenyl-n-propyl, cyclohexyl, cyclohexyl-$C_1$–$C_2$-alkyl or an ethylene or 1,3-propylene radical connected to the 6-position of the coumarin and optionally substituted by 1 to 3 methyl groups.

Particularly preferred radicals $T^2$ are unsubstituted $C_1$–$C_5$-alkyl radicals, $\beta$-cyanoethyl, $\beta$-methoxyethyl, $\beta$-ethoxyethyl, $\beta$-n-butoxyethyl, $\beta$-chloroethyl, $\beta$-bromoethyl, $\beta$-carbamoylethyl, $\beta$-methoxycarbonylethyl, $\beta$-ethoxycarbonylethyl, $\beta$-hydroxyethyl, $\beta$-acetoxyethyl, $\beta$-methoxycarbonyloxyethyl, benzyl, $\beta$-phenylethyl, $\gamma$-phenyl-n-propyl, $\beta$-phenoxyethyl or can ethylene radical connected to the 8-position of the coumarin.

Particularly preferred radicals R are unsubstituted $C_1$–$C_5$-alkyl, $\beta$-hydroxyethyl, $\beta$-hydroxy-n-propyl, $\beta$-methoxyethyl, $\beta$-ethoxyethyl, $\beta$-n-propoxyethyl, $\beta$-n-butoxyethyl, $\beta$-cyanoethyl, $\beta$-chloroethyl, $\beta$-benzyloxyethyl, $\beta$-phenoxyethyl, $\beta$-cyclohexyloxyethyl, di-($C_1$–$C_2$-alkyl)amino, tri-($C_1$–$C_2$-alkyl)ammonium, allyl, benzyl, $\beta$-phenylethyl, cyclohexyl and phenyl. Hydrogen is particularly preferred as $T^3$ and CN is paticularly preferred as $Q'$. In particularly preferred compounds of the formula II, the ring $A'$ does not carry any further substituents.

The monomethine compounds of the formula I are prepared, for example, by condensing a compound of the formula

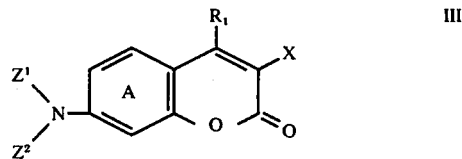

wherein

Z¹, Z², R¹ and A have the abovementioned meaning and

X represents an optionally functionally modified aldehyde group with a methylene-active compound of the formula

      IV wherein

Q has the abovementioned meaning.

In addition to hydrazones, possible functionally modified aldehyde groups are, in particular azomethines, preferably aniles and oximes.

The starting compounds of the formula III are obtainable, for example, in accordance with the instructions of German Patent Application No. P 24, 13, 281.8 by reacting compounds of the formula

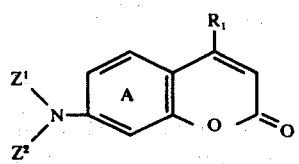      V wherein

Z¹, Z², R¹ and A have the abovementioned meaning with a "Vilsmeier reagent" such as is obtainable, for example, from dimethylformamide and phosphorus oxychloride, if desired hydrolysing the reaction product, thus obtained, to the free aldehyde compound III (X = CHO) and, if desired, further reacting the primary reaction product or the free aldehyde compound with an "aldehyde reagent" such as aniline or hydroxylamine.

It is not absolutely essential to employ the compound of the formula III as a substance which has been isolated, in the process according to the invention which leads to I; instead, it is also possible to dispense with the intermediate isolation of the azomethine intermediate product prepared by a Vilsmeier reaction from V and instead, after hydrolysis with a small amount of water and with a base such as sodium hydroxide solution or ammonia at a pH value above 5, to condense compound III directly with the methylene-active compound IV.

The following may be mentioned as examples of suitable starting compounds of the formula III: 7-diethylamino-coumarin-3-aldehyde, 7-dimethylamino-coumarin-3-aldehyde, 7-di-n-propylamino-coumarin-3-aldehyde, 7-di-n-butyl-amino-coumarin-3-aldehyde, 7-di-β-cyanoethylamino-coumarin-3-aldehyde, 7-di-β-chloroethylamino-coumarin-3-aldehyde, 7-β-cyanoethylbenzylamino-coumarin-3-aldehyde, 7-di-β-hydroxyethylamino-coumarin-3-aldehyde, 7-di-β-methoxyethylamino-coumarin-3-aldehyde, 7-di-β -ethoxye-thylamino-coumarin-3-aldehyde, 7-di-cyclohexylamino-coumarin-3-aldehyde, 7-di-cyclopentylamino-coumarin-3-aldehyde, 7-cyclohexyl-methylamino-coumarin-3-aldehyde, 7-di-benzylamino-coumarin-3-aldehyde, 7-n-butyl-benzylamino-coumarin-3-aldehyde-oxime, 7-α-phenylethylmethylamino-coumarin-3-aldehyde, 7-di-β-phenylethylamino-coumarin-3-aldehyde, 7-di-γ-phenyl-n-propylamino-coumarin-3-aldehyde, 7-di-β-phenoxyethylamino-coumarin-3-aldehyde, 7-β-phenoxyethyl-ethylamino-coumarin-3-aldehyde, 7-β-cyclohexyloxyethyl-ethylamino-coumarin-3-aldehyde, 7-β-pentachlorophenoxyethyl-methylamino-coumarin-3-aldehyde, 7-di-n-pentylamino-coumarin-3-aldehyde, 7-di-β-acetoxyethylamino-coumarin-3-aldehyde, 7-di-(γ-dimethylamino-n-propyl)-amino-coumarin-3-aldehyde, 7-γ-dimethylamino-n-propyl-methylamino-coumarin-3-aldehyde, 7-β-sulphoethyl-methylamino-coumarin-3-aldehyde-anil, 7-di-(sulphobenzylamino)-coumarin-3-aldehyde-anil, 7-β-methylsulphonylethylmethylamino-coumarin-3-aldehyde, 7-β-methylsulphonylaminoethyl-methylamino-coumarin-3-aldehyde, 7-β-phenylsulphonyl-n-propyl-methylamino-methylamino-coumarin-3-aldehyde, 7-phthalimidomethylethylamino-coumarin-3-aldehyde, 7-N-morpholinyl-coumarin-3-aldehyde, 7-N-piperidinyl-coumarin-3-aldehyde, 7-N-pyrrolidinyl-coumarin-3-aldehyde, 7-N'-methyl-N-piperazinyl-coumarin-3-aldehyde, 7-N-isoindolinyl-coumarin-3-aldehyde, 7-ethylamino-6-methoxy-coumarin-3-aldehyde, 7-dimethylamino-6-methylcoumarin-3-aldehyde, 7-acetaminodoethyl-ethylamino-coumarin-3-aldehyde, 7-di-β-carbamoyl-ethylamino-coumarin- 3-aldehyde, 7-benzyloxyethyl-ethylamino-coumarin-3-aldehyde, 7-di-β-methoxycarbonylethylamino-coumarin-3-aldehyde, 7-dimethylamino-6-chloro-coumarin-3-aldehyde, 7-diethylamino-4-methyl-coumarin-3-aldehyde, 7-diethylamino-8-N-morpholinylmethyl-coumarin-3-aldehyde, 7-diethylamino-8-chloromethyl-coumarin-3-aldehyde, 7-diethylamino-8-N-phthalimidylmethyl-coumarin-3-aldehyde, 7-diethylamino-succinimidyl-methyl-coumarin-3-aldehyde, 7-diethylamino-6-N-piperidinylmethyl-coumarin-3-aldehyde, 7-diethylamino-8-morpholinylmethyl-coumarin-3-aldehyde, 7-diethylamino-coumarin-3-aldehyde-8-methyl-N-pyridinium chloride, 7-diethylamino-8-sulphomethyl-coumarin-3-aldehyde-anil, 7-diethylamino-coumarin-3-aldehyde-p-chloranil, 7-diethylaminocoumarin-3-aldehyde-p-methylanil, 7-diethylamino-coumarin-3-aldehyde-p-sulphoanil, 7-diethylamino-coumarin-3-aldehyde-p-methoxyanil, 7-di-β-methoxycarbonyloxyethylamino-coumarin-3-aldehyde, 7-β-phenoxycarbonyloxyethyl-methylamino-coumarin-3-aldehyde, 7-β-carboxyethylamino-coumarin-3-aldehyde as well as the compounds of the formulae

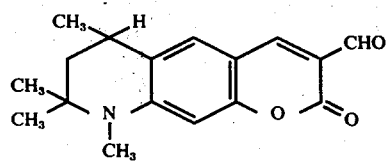

and

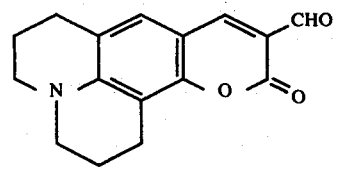

The following may be mentioned as examples of suitable starting compounds of the formula IV malodinitrile, cyanoacetic acid methyl ester, cyanoacetic acid ethyl ester, cyanoacetic acid n-propyl ester cyanoacetic acid isopropyl ester, cyanoacetic acid n-butyl ester, cyanoacetic acid isoamyl ester, cyanoacetic acid n-hexyl ester, cyanoacetic acid octyl ester, cyanoacetic acid β-hydroxyethyl ester, cyanoacetic acid β-ethoxyethyl ester, cyanoacetic acid β-butoxyethyl ester, cyanoacetic acid α-benzyloxyethyl ester, cyanoacetic acid β-phenoxyethyl ester, cyanoacetic acid benzyl ester, cyanoacetic acid β-phenylethyl ester, cyanoacetic acid phenyl ester, cyanoacetic acid cyclohexyl ester, cyanoacetic acid β-chloroethyl ester, cyanoacetic acid β-cyanoethyl ester, cyanoacetic acid γ-dimethylaminopropyl ester, cyanoacetic acid β-N-morpholinylethyl ester, cyanoacetic acid β-dimethylaminoethyl ester, α-cyanoacetoxyethyl-trimethylammonium methosulphate, β-cyanoacetoxyethyl-triethylammonium chloride, β-cyanoacetoxyethyl-N-methyl-morpholinium methosulphate, γ-cyanoacetoxy-n-propyl-N-trimethylammonium iodide, β-cyanoacetamidoethyl-trimethylammonium sulphate, cyanoacetic acid β-bromoethyl ester, cyanoacetic acid β-cyclohexyloxyethyl ester, cyanoacetic acid β-carbamoylethyl ester, N-methyl-cyanoacetamide, N,N-diethylcyanoacetamide, cyanoacetanilide, cyanoacetylurea and N-cyanoacetyl-N'-phenyl-urea.

The condensation of III and IV is carried out under the customary conditions of a Knoevenagel reaction, in an inert organic solvent, in the presence of a basic catalyst.

In general, the reactants III and IV are employed in approximately equimolar amounts, but preferably IV is employed in slight excess, say 5 to 10% excess.

As basic catalysts it is possible to employ the compounds usually used in the Knoevenagel reaction, such as, for example, ammonia, sodium acetate, potassium carbonate, potassium hydroxide, sodium methylate, sodium ethylate, and organic nitrogen bases such as diethylamine, dimethylamine, pyridine and morpholine. Preferred catalysts are piperidine, pyrrolidine and piperidine acetate.

Inert organic solvents which can be used are both polar and non-polar solvents, and, when using water-immiscible solvent, the water produced in the reaction is conveniently removed from the reaction mixture by azeotropic distillation. If cyanoacetic acid esters are employed as reactants of the formula IV and partial or complete trans-esterification is to be avoided, then of course either the same alcohol as that already present in the cyano-ester as the alcohol component of the ester, or a solvent free from alcoholic groups, is used.

Examples of solvents which are used are: alcohols such as methanol, ethanol, isopropanol, n-propanol, n-butanol, cyclohexanol, benzyl alcohol, β-phenylethyl alcohol, glycol, glycol monomethyl ether, glycol monoethyl ether and β-dimethylaminoethanol; amides such as formamide, dimethylformamide, dimethylacetamide and N-methylpyrrolidone; dimethylsulphoxide; acetonitrile, dioxane and tetrahydrofurane; and water-immiscible solvents such as benzene, toluene, xylene or chlorobenzene.

The reaction temperatures can be varied over a wide range, for example from 20°–150° C; preferably, the reaction is carried out at the boiling point of the solvent employed.

The monomethine dyestuffs of the formula I can be used for dyeing and printing natural, semi-synthetic and synthetic fibrous materials and fabrics.

Whilst the dyestuffs containing sulpho groups are in particular suitable for dyeing and printing polyamide, polyurethane and wool fibers and the cationic dyestuffs are preferentially suitable for dyeing fibers containing acid groups, such as polyacrylonitrile, acid-modified polyesters and acid-modified polyamides, the monomethine dyestuffs of the formula I, which are free from ionic groups which confer solubility in water, are disperse dyestuffs for dyeing and printing polyester, polyamide, polyurethane, cellulose ½-acetate, cellulose triacetate, polypropylene and polyacrylonitrile fibres.

The dyestuffs according to the invention, of the formula I, produce — on the fibers and fabrics mentioned — very clear dyeings in orange to red shades which are distinguished by high brilliance, because of their fluorescence in UV light and daylight, and by good fastness properties in use. Technologically particularly valuable dyestuffs of the formula I are those which correspond to the formula

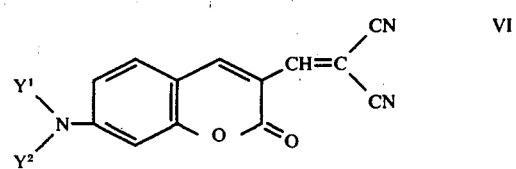

wherein $Y^1$ represents unsubstituted $C_1$–$C_5$-alkyl, phenyl-$C_1$–$C_3$-alkyl, β-chloroethyl, β-cyanoethyl, β-carbamoylethyl, β-$C_1$–$C_2$-alkoxyethyl, β-phenoxyethyl which is optionally substituted by 1 to 5 chlorine atoms, β-cyclohexyloxyethyl or cyclohexyl, and $Y^2$ represents unsubstituted $C_1$–$C_5$-alkyl, phenyl-$C_1$–$C_3$-alkyl, β-chloroethyl, β-cyanoethyl, β-carbamoylethyl, β-$C_1$–$C_2$-alkoxyethyl or β-phenoxyethyl.

The dyestuffs of the formula I can be dyed either from aqueous dispersions or from organic solutions, for example from solutions in which water-immiscible solvents such as tetrachloroethylene, trichloroethylene, 1,1,2-trichloroethylene or 1,1,1-trichloropropane are used.

A particularly valuable field of use for dyestuffs of the formula I is the transfer printing process. For this, sublimable dyestuffs of the formula I can be used, which are free from ionic groups which confer solubility in water and preferably correspond to the formula

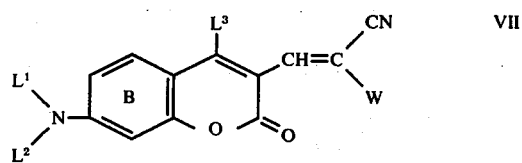

wherein $L^1$ and $L^2$ represent $C_1$–$C_4$-alkyl radicals which are optionally substituted by nitrile, chlorine, hydroxyl, $C_1$–$C_3$-alkoxy, $C_1$–$C_3$-alkoxycarbonyl or acetoxy, or represent 2-membered or 3-membered optionally methylsubstituted alkylene groups which are connected to the 6- or 8-position of the coumarin, or together with the shared N atom represent morpholine, piperidine or pyrrolidine, $L^3$ represents hydrogen or methyl, W represents CN or $COOL^4$ and $L^4$ represents $C_1$–$C_4$-alkyl which is optionally substituted by $C_1$–$C_3$-alkoxy, nitrile or phenyl, and wherein the ring B can be substituted by methyl or chloromethyl.

The transfer printing process, as described, for example, in French Patent Specification Nos. 1,223,330 and 1,334,829, comprises, as is known, the transfer, that is to say the trans-sublimation, of the dyestuffs from a temporary support, printed with special printing inks, onto the substrate to be printed, as a result of the action of heat and, if appropriate, pressure. Examples of possible substrates are polyester, polyamide, polyacrylonitrile, acid-modified polyester and acid-modified polyamide fibre materials. The temporary supports used are preferably paper, but also cellophane, cellulose textiles, metal foils and the like. The dyestuffs to be transferred are in general not applied as such to the temporary supports, but instead are applied, in a manner which is in itself known, by means of printing pastes, spraying solutions, dyeing liquors and, preferably, anhydrous printing inks which give a neutral reaction.

The printing inks comprise at least a) a dyestuff of the formula I, preferably of the formula VII, which is sublimable at 160° to 240° C, b) an organic solvent which is customary for printing inks and c) a resin soluble in the solvent. In general, the dyestuff is present in these printing inks in the form of a solution.

Suitable solents are: hydrocarbons such as benzene, toluene and xylene; chlorinated hydrocarbons such as chlorobenzene, ethylene chloride, trichloroethylene and tetrachloroethylene; alcohols such as methanol, ethanol, isopropanol, butanol and benzyl alcohols; ketones such as methyl ethyl ketone and cyclohexanone, and various ethers and esters. They can be used in the pure form or as mixtures. Examples of suitable resins are ketone resins, such as, say, Kunstharz AFS (R), and cellulose ethers, such as, say, ethylcellulose.

To improve the sharpness of contour of the prints produced according to the invention it is possible, if desired, to coat the temporary supports, printed with the new printing inks, with a layer of a colourless binder or resin, in accordance with the instructions of German Offenlegungsschrift (German Published Specification) No. 2,110,910.

For certain purposes, say for printing paper with rotary screen printing machines, aqueous printing inks are preferably used which in addition to a sublimable dyestuff of the formula I contain binders, thickeners and fillers customary in printing technology and also, optionally, surface-active agents and/or organic water-miscible solvents. So-called highly filled inks, with a binder : filler weight ratio of 1:6 to 1:8, are preferred.

Suitable substrates which take up the dyestuff in the transfer printing process are, preferably, textile materials of the abovementioned types of fibres and non-textile articles of corresponding polymers.

The dyestuff transfer is effected at temperatures of 160° to 240° C, preferably 200° to 220° C, over the course of 15 to 60 seconds.

The heat transfer can be effected by direct contact with heating plates, by hot air, by superheated steam or by infrared radiation. Very brilliant dyeings and prints are obtained on the materials used as substrates, and these prints exhibit good fastness properties in use, such as good fastness to washing, rubbing and light.

EXAMPLE 1

2ml of piperidine are added to 24.5 g of 7-diethylamino-coumarin-3-aldehyde and 7 g of malodinitrile . . . 300 ml of ethanol, and the mixture is heated to the boil under reflux for 15 minutes, whilst stirring, and is then cooled. The crystalline precipitate is filtered off, washed with ethanol, recrystallised moist from 200 ml of dimethylformamide, washed with ethanol and dried in vacuo at 70° C. 24.5 g of compound of the formula

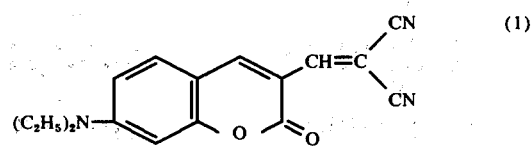

are obtained as red-violet crystal needles which give a luminous red solution, with an orange-coloured fluorescence, in dimethylformamide. On polyesters (transfer printing process) the dyestuff shows a very brilliant scarlet shade having good fastness properties.

The same result is achieved if instead of the aldehyde an equivalent amount of the corresponding aldoxime or anil is employed.

The 7-diethylamino-coumarin-3-aldehyde employed as the starting compound is obtainable as follows:

57.8 g of 7-diethylamino-coumaric-3-carboxylic acid ethyl ester in 235 ml of 18% strength hydrochloric acid are heated for 5 hours to the boil under reflux, in the course of which saponification and decarboxylation occurs and the 7-diethylaminocoumarin formed dissolves as the hydrochloride to give a colourless solution. After cooling, 45 ml of saturated sodium acetate solution are added and the pH value is adjusted to 4 – 5 with about 70 ml of 45% strength sodium hydroxide solution, whilst cooling. The crystalline precipitate is filtered off, thoroughly washed with water and dried in vacuo at 50° C. Yield, about 42 g of 7-diethylaminocoumarin.

20 g of dimethylformamide are added dropwise to 40 g of phosphorus oxychloride at 20°–50° C. The mixture is stirred for 45 minutes at 50° C whilst excluding moisture. A suspension of 42 g of 7-diethylamino-coumarin in 50 g of dimethylformamide is then added, the mixture is warmed to 60° C for 2 hours and poured out onto 400 g of ice water, and the whole is stirred for 2 hours. The crystalline precipitate is filtered off, thoroughly washed with water and dried in vacuo at 70° C. 41 g of 7-diethylamino-coumarin-3-aldehyde are obtained.

The dyestuffs indicated in the table which follows are prepared analogously to compounds (1) from the appropriate starting compounds.

Compounds of the formula

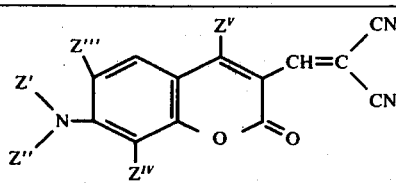

| No. | Z' | Z'' | Z''' | Z^IV | Z^V | Colour shade |
|---|---|---|---|---|---|---|
| 2 | n-C$_3$H$_7$— | n-C$_3$H$_7$— | H | H | H | brilliant scarlet (PE) |
| 3 | n-C$_4$H$_9$— | n-C$_4$H$_9$— | H | H | H | brilliant scarlet (PE) |
| 4 | n-C$_5$H$_{11}$— | n-C$_5$H$_{11}$— | H | H | H | brilliant scarlet (PE) |
| 5 | NC—CH$_2$—CH$_2$— | NC—CH$_2$—CH$_2$— | H | H | H | brilliant red-orange (PE) |
| 6 | Cl—CH$_2$—CH$_2$— | C$_2$H$_5$ | H | H | H | brilliant scarlet (PE) |
| 7 | CH$_3$O—CH$_2$—CH$_2$— | CH$_3$O—CH$_2$—CH$_2$— | H | H | H | brilliant yellowish-tinged red (PE) |
| 8 | C$_2$H$_5$O—CH$_2$—CH$_2$— | C$_2$H$_5$—O—CH$_2$—CH$_2$— | H | H | H | brilliant yellowish-tinged red (PE) |
| 9 | C$_2$H$_5$O—CO—CH$_2$—CH$_2$— | CH$_3$ | H | H | H | brilliant yellowish-tinged red (PE) |
| 10 | CH$_3$—CO—CH$_2$—CH$_2$— | CH$_3$—C(O)—O—CH$_2$—CH$_2$— | H | H | H | brilliant scarlet (PE) |
| 11 | HO—CH$_2$—CH$_2$— | HO—CH$_2$—CH$_2$— | H | H | H | brilliant yellowish-tinged red (PE) |
| 12 | CH$_3$O—CO—OCH$_2$—CH$_2$— | CH$_3$O—CO—OCH$_2$—CH$_2$— | H | H | H | brilliant scarlet (PE) |
| 13 | CH$_3$—C(O)—NH—CH$_2$—CH$_2$— | C$_2$H$_5$ | H | H | H | brilliant yellowish-tinged red (PE) |
| 14 | NC—CH$_2$—CH$_2$— | CH$_3$ | H | H | H | brilliant red-orange (PE) |
| 15 | Br—CH$_2$—CH$_2$— | C$_2$H$_5$ | H | H | H | brilliant scarlet (PE) |
| 16 | C$_6$H$_5$—CH$_2$— | C$_6$H$_5$—CH$_2$— | H | H | H | brilliant orange (PE) |
| 17 | C$_6$H$_5$—CH$_2$—CH$_2$— | C$_6$H$_5$—CH$_2$—CH$_2$— | H | H | H | brilliant red-orange (PE) |
| 18 | C$_6$H$_5$—CH$_2$—CH$_2$—CH$_2$— | C$_6$H$_5$—CH$_2$—CH$_2$—CH$_2$— | H | H | H | brilliant red-orange (PE) |
| 19 | C$_6$H$_5$—O—CH$_2$—CH$_2$— | C$_6$H$_5$—O—CH$_2$—CH$_2$— | H | H | H | brilliant scarlet (PE) |
| 20 | C$_6$H$_5$—CH$_2$—O—CH$_2$—CH$_2$— | C$_2$H$_5$— | H | H | H | brilliant scarlet (PE) |
| 21 | C$_6$H$_{11}$—O—CH$_2$—CH$_2$— | C$_6$H$_{11}$—O—CH$_2$—CH$_2$— | H | H | H | brilliant yellowish-tinged red (PE) |
| 22 | C$_6$H$_5$—O—CO—O—CH$_2$—CH$_2$— | C$_2$H$_5$— | H | H | H | brilliant scarlet (PE) |
| 23 | C$_6$H$_{11}$— | C$_2$H$_5$— | H | H | H | brilliant scarlet (PE) |
| 24 | C$_6$Cl$_5$—O—CH$_2$—CH$_2$— | C$_2$H$_5$— | H | H | H | brilliant yellowish-tinged red (PE) |
| 25 | C$_6$H$_5$—CH$_2$— | C$_2$H$_5$— | H | H | H | brilliant red-orange (PE) |
| 26 | C$_6$H$_{11}$—CH$_2$— | C$_2$H$_5$— | H | H | H | brilliant red-orange (PE) |
| 27 | C$_6$H$_5$—CH(CH$_3$)— | C$_2$H$_5$— | H | H | H | brilliant red-orange (PE) |
| 28 | C$_6$H$_5$—O—CH$_2$—CH$_2$— | C$_2$H$_5$— | H | H | H | brilliant yellowish-tinged red (PE) |
| 29 | C$_6$H$_5$—CH$_2$— | NC—CH$_2$—CH$_2$— | H | H | H | brilliant orange (PE) |
| 30 | C$_6$H$_{11}$—O—CH$_2$—CH$_2$— | C$_2$H$_5$— | H | H | H | brilliant yellowish-tinged red (PE) |
| 31 | C$_6$H$_5$—NH—C(O)—NH—CH$_2$—CH$_2$— | C$_2$H$_5$— | H | H | H | brilliant scarlet (PE) |
| 32 | CH$_3$—SO$_2$—CH$_2$—CH$_2$—CH$_2$— | C$_2$H$_5$— | H | H | H | brilliant scarlet (PE) |

-continued

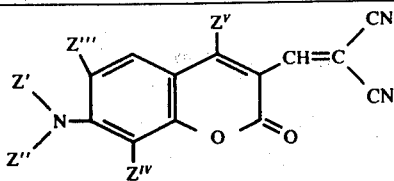

| No. | Z' | Z'' | Z''' | Z$^{IV}$ | Z$^V$ | Colour shade |
|---|---|---|---|---|---|---|
| 33 | C$_6$H$_5$—CH$_2$—SO$_2$—NH—CH$_2$—CH$_2$— | C$_2$H$_5$— | H | H | H | brilliant scarlet (PE) |
| 34 | CH$_3$—SO$_2$—N(CH$_3$)—CH$_2$—CH$_2$— | C$_2$H$_5$— | H | H | H | brilliant scarlet (PE) |
| 35 | C$_6$H$_5$—SO$_2$—NH—CH$_2$—CH$_2$— | C$_2$H$_5$— | H | H | H | brilliant scarlet (PE) |
| 36 | phthalimido-N—CH$_2$— | C$_2$H$_5$— | H | H | H | orange (PE) |
| 37 | C$_6$H$_5$—C$_6$H$_4$—O—CH$_2$—CH$_2$— | C$_2$H$_5$— | H | H | H | brilliant yellowish-tinged red (PE) |
| 38 | 2,4,5-Cl$_3$—C$_6$H$_2$—O—CH$_2$—CH$_2$— | C$_2$H$_5$— | H | H | H | clear yellowish-tinged red (PE) |
| 39 | NaO$_3$S—CH$_2$—CH$_2$— | CH$_3$— | H | H | H | clear orange (PA) |
| 40 | (CH$_3$)$_2$N—CH$_2$—CH$_2$—CH$_2$— | C$_2$H$_5$— | H | H | H | red-orange (PE) |
| 41 | (CH$_3$)$_3$$^+$N—CH$_2$—CH$_2$—CH$_2$— Cl$^-$ | C$_2$H$_5$— | H | H | H | clear reddish-tinged orange (PAN) |
| 42 | C$_2$H$_5$ | C$_2$H$_5$ | H | H | CH$_3$ | orange (PE) |
| 43 | Z'/Z''N= pyrrolidine | | H | H | H | brilliant scarlet (PE) |
| 44 | Z'/Z''N= piperidine | | H | H | H | brilliant scarlet (PE) |
| 45 | Z'/Z''N= morpholine | | H | H | H | brilliant yellowish-tinged red (PE) |
| 46 | Z'/Z''N=CH$_3$—piperazine | | H | H | H | clear red-orange (PE) |
| 47 | Z'/Z''N= tetrahydroisoquinoline | | H | H | H | brilliant reddish-tinged orange (PE) |
| 48 | HOOC—CH$_2$—CH$_2$— | C$_2$H$_5$ | H | H | H | clear red-orange (PE) |
| 49 | C$_6$H$_5$—CH$_2$—O—CO—CH$_2$—CH$_2$— | CH$_3$ | H | H | H | brilliant red-orange (PE) |
| 50 | C$_6$H$_5$—SO$_2$—CH$_2$—CH$_2$— | CH$_3$ | H | H | H | clear reddish-tinged orange (PE) |
| 51 | pyridinium$^+$—CH$_2$—CH$_2$— Cl$^-$ | CH$_3$ | H | H | H | clear red-orange (PAN) |
| 52 | C$_2$H$_5$ | H | OCH$_3$ | H | H | red (PE) |
| 53 | CH$_3$O—CO—C$_6$H$_4$—CO—O—CH$_2$—CH$_2$— | C$_2$H$_5$ | H | H | H | brilliant red-orange (PE) |
| 54 | C$_2$H$_5$ | C$_2$H$_5$ | H | CH$_2$Cl | H | orange (PE) |

-continued

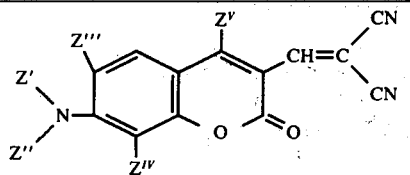

| No. | Z' | Z'' | Z''' | Z^IV | Z^V | Colour shade |
|---|---|---|---|---|---|---|
| 55 | $C_2H_5$ | $C_2H_5$ | $CH_3$ | H | H | reddish-tinged orange (PE) |
| 56 | $C_2H_5$ | $CH_3$ | Cl | H | H | orange (PE) | as well as the compounds of the formula

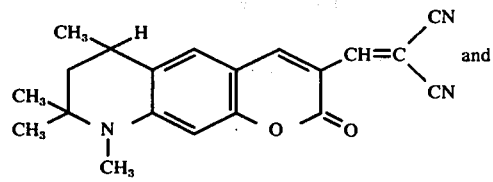

Brilliant scarlet (PE)

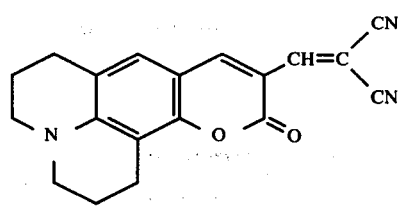

Brilliant scarlet (PE)

acetic acid ethyl ester in 150 ml of ethanol and the mixture is heated to the boil under reflux for 1 hour, whilst stirring. After cooling, the crystalline precipitate is filtered off, washed with ethanol, recrystallized twice from 200 ml of dimethylformamide at a time, washed with ethanol and dried in vacuo at 70° C. 28.7 g of compound of the formula

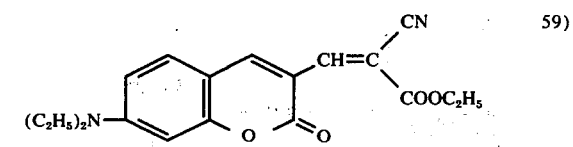

is obtained.

In dimethylformamide the red crystalline substance shows an orange-coloured fluorescence. When used to dye polyester, a brilliant yellow-orange colour shade having good fastness properties is obtained.

The following dyestuffs are obtained analogously using the appropriate starting compounds:

Dyestuffs of the formula

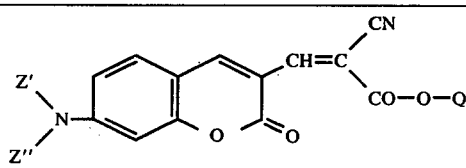

| No. | Z' | Z'' | Q | Colour shade (on polyester) |
|---|---|---|---|---|
| 60 | n-$C_4H_9$— | n-$C_4H_9$— | —$CH_2$—⌬ | clear orange |
| 61 | NC—$CH_2$—$CH_2$— | NC—$CH_2$—$CH_2$— | —$CH_2$—$CH_2$—$OCH_3$ | clear yellow-orange |
| 62 | ⌬—$CH_2$ | $C_2H_5$ | —⌬ | brilliant orange |
| 63 | Cl—$CH_2$—$CH_2$— | Cl—$CH_2$—$CH_2$— | —$(CH_2)_3$—$CH_3$ | clear yellow-orange |
| 64 | ⌬—$CH_2$—$CH_2$— | $C_2H_5$ | —$CH_2$—$CH_2$—Cl | brilliant orange |
| 65 | $CH_3O$—$CH_2$—$CH_2$— | $CH_3O$—$CH_2$—$CH_2$— | ⌬(H) | red-orange |
| 66 | $C_2H_5$ | $C_2H_5$ | —$CH_2$—CH=$CH_2$ | brilliant yellow-orange |
| 67 | $C_2H_5$ | $C_2H_5$ | —$CH_2$—$CH_2$—CN | brilliant yellow-orange |

Code:
PE = polyester
PA = polyamide
PAN = polyacrylonitrile

EXAMPLE 59

2 ml of piperidine are added to 24.5 g of 7-diethylamino-coumarin-3-aldehyde and 11.5 g of cyano-

EXAMPLE 68

3 drops of piperidine are added to 14.1 g of 7-diethylamino-coumarin-3-aldehyde and 12.3 g of cyanoacetoxyethyl N-trimethylammonium methosulphate in 50 ml of acetonitrile and the mixture is stirred for 2 hours at 60° C. The solvent is distilled off in vacuo, and the residue is purified by extracting it three times by boiling with acetone and subsequently recrystallising it from 40 ml of acetonitrile. 15.5 g of the dyestuff of the formula

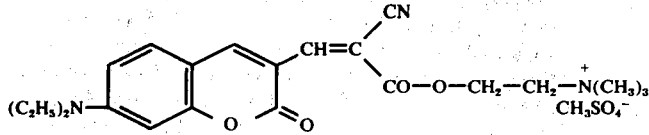

are obtained as a red crystalline water-soluble dyestuff powder which dissolves in dimethylformamide to give a strong red-orange fluorescence. On polyacrylonitrile or acid-modified polyester the dyestuff shows brilliant reddish-tinged orange-coloured shade having good fastness properties.

Analogously, the appropriate starting materials give the dyestuff of the formula

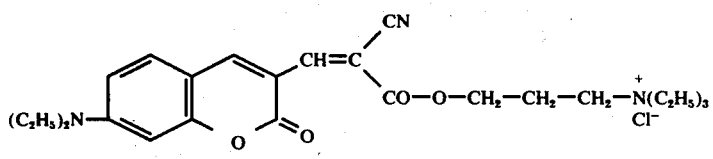

Brilliant reddish-tinged orange with comparable valuable tinctorial properties to those of the compound 68).

EXAMPLE 70

2 ml of piperidine are added to 24.5 g of 7-diethylamino-coumarin-3-aldehyde and 9.9 g of cyanoacetic acid N-methylamide in 100 ml of isopropanol and the mixture is heated to boil under reflux for 1 hour, whilst stirring. After cooling, the crystalline precipitate is filtered off, washed with isopropanol, recrystallised from 200 ml of dimethylformamide, washed with ethanol and dried in vacuo at 60° C. 32 g of dyestuff of the formula

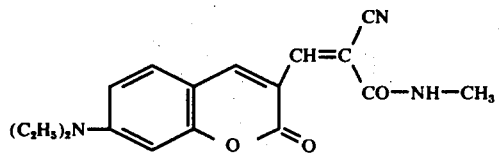

are obtained. On polyester, the dyestuff shows a very clear orange-coloured shade. Dyestuffs with comparable properties are obtained if, instead, of, cyanoacetic acid N-methylamide equivalent amounts of N,N-diethylcyanoacetamide, cyanoacetanilide, cyanoacetylurea or N-cyanoacetyl-N'-phenylurea are employed.

EXAMPLE 71

20 g of dimethylformamide are added dropwise to 40 g of phosphorus oxychloride at 20° to 50° C. The mixture is stirred for 45 minutes at 50° C, with exclusion of moisture. A suspension of 43.4 g of 7-diethylaminocoumarin in 50 g of dimethylformamide is then added, the mixture is warmed to 60° C for 2 hours, 130 ml of ethanol are added whilst cooling the mixture at 40° to 50° C, the pH value is adjusted to 8 by adding 30% strength ammonia, 14 g of malonic acid dinitrile are added and the mixture is heated to the boil under reflux for 30 minutes. After cooling, the crystalline precipitate is filtered off, washed with ethanol, recrystallised from 400 ml of dimethylformamide, again washed with ethanol and dried in vacuo at 70° C. 47 g of compound of the formula 1) are obtained.

EXAMPLE 72

20 g of dyestuff of the formula 1, 0–7.5 g of a cyclohexanone-formaldehyde resin of softening point above 160° C and 10 to 2.5 g of ethylcellulose $N_4$ are ground in a bead mill. 100 g of a printing ink are prepared by adding toluene containing 10% of Polywachs. Paper is impregnated with this printing ink, using a spray gun. If this paper is pressed against a polyacrylonitrile fibre textile for 15 – 30 seconds at 180° C, a clear somewhat greenish-tinged yellow print with good fastness properties is obtained. If a textile of acid-modified polyester fibres (Dacron 64) is used, a deep yellow, very clear dyeing is again obtained. If the paper carrying the dyestuff is pressed against a textile of polyester fibres or cellulose triacetate fibres for 15 – 30 seconds at 180° C, a brilliant yellowish-tinged red print with an orange fluorescence and good fastness properties is obtained. Prints with comparably valuable properties are obtained if instead of the dyestuff of the formula 1, a dyestuff of the formula 2, 3, 4, 5, 6, 7, 8, 9 10, 11, 12, 13, 14, 43, 44, 45, 57, 58, 59, 61, 66 or 67 is employed.

EXAMPLE 73

75 g of dyestuff of the formula 1 and 50 g of a condensation product of naphthalenesulphonic acid and formaldehyde are finely ground in a ball mill in the presence of 100 g of water. A printing paste is prepared from the dispersion thus obtained by thickening with 400 g of a 10% strength carob bean flour ether thickener and 400 g of water. Paper is printed with this paste, by the gravure printing process. If this paper is pressed against a textile of polyester fibres for 15 to 60 seconds at 200° C, a brilliant, fluorescent, yellowish-tinged red, very fast print is obtained.

EXAMPLE 74

Polyacrylonitrile fibres are introduced, using a liquor ratio of 1:40, into an aqueous bath at 40° C which contains, per liter, 0.75 g of 30% strength acetic acid, 0.38 g of sodium acetate and 0.05 g of dyestuff of the formula 68. The dye bath is heated to the boil over the course of 30 minutes and is kept at this temperature for 45 minutes. After rinsing and drying, a brilliant reddish-tinged orange dyeing with good fastness properties is obtained.

EXAMPLE 75

An approximately 0.3% strength dyeing with dyestuff 26 on polyethylene terephthalate fabric is produced as follows:

Using a liquor ratio of 1:40, the fabric is introduced into a dye bath at 50° C which contains the finely divided dyestuff, 2 g/l of a conventional anionic dispersing agent, 5 g/l of o-cresotic acid methyl ester and 1 g/l of $NaH_2PO_4$ and has been adjusted to pH 4.5 with acetic acid. The temperature is raised to 80°–85° C over the course of 20 minutes and the bath is left in this temperature range for a further 20 minutes. Thereafter the liquor is gradually brought to the boil. After boiling for 1 – 1.5 hours, the fabric is rinsed first with hot water and then with cold water, and is then dried. A brilliant red-orange dyeing with good fastness properties is obtained.

I claim:

1. Monomethine dyestuff of the general formula

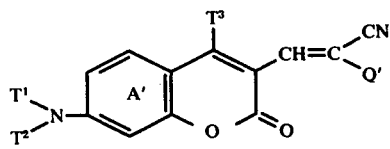

wherein $T^1$ and $T^2$ independently of one another are unsubstituted $C_1$–$C_5$-alkyl uninterrupted or interrupted by —O—; $C_1$–$C_4$-alkyl monosubstituted or disubstituted by hydroxyl or chlorine; $C_1$–$C_4$ alkyl monosubstituted by bromine, nitrile, $C_1$–$C_4$-alkoxycarbonyl, aminocarbonyl, phenoxy, benzyloxy, cyclohexyloxy, cyclohexyl, $C_1$–$C_4$-alkoxycarbonyloxy, $C_1$–$C_4$-alkylcarbonyloxy, acetylamino, $C_1$–$C_4$-alkylsulphonylamino, aminocarbonyloxy, di-($C_1$–$C_4$-alkyl) amino, carboxyl or sulpho; cyclohexyl; phenyl-$C_1$–$C_3$-alkyl; hydrogen; or $C_1$–$C_4$-alkyl uninterrupted or interrupted by —O— and substituted by benzyloxycarbonyl, phenoxycarbonyl, phenoxy substituted by 1–5 chlorine atoms, $C_1$–$C_4$-alkylsulphonyl, benzylsulphonyl, phenylsulphonyl, benzylcarbonyloxy, benzoyloxy, $C_1$–$C_4$-alkoxycarbonylbenzoyloxy, phenoxycarbonyloxy, tri-($C_1$–$C_4$-alkyl)ammonium, benzoylamino, phenylaminocarbonylamino, phenylsulphonylamino or toluenesulphonylamino;

$T^3$ is hydrogen or methyl;

$Q'$ is CN or COOR; and the ring $A'$ is unsubstituted or substituted by methoxy, methyl or chloromethyl.

2. Monomethine dyestuff of claim 1 wherein $Q'$ is CN and $T^3$ is hydrogen.

3. Monomethine dyestuff of claim 1 wherein $T^1$ is unsubstituted $C_1$–$C_5$-alkyl, β-cyanoethyl, β-methoxyethyl, β-ethoxyethyl, β-n-butoxyethyl, β-chloroethyl, β-bromoethyl, β-carbamoylethyl, β-methoxycarbonylethyl, β-ethoxycarbonylethyl, β-methoxycarbonyloxyethyl, β-carboxyethyl, β-hydroxyethyl, β-acetoxyethyl, β-benzoyloxyethyl, β-benzyloxyethyl, β-cyclohexyloxyethyl, β-phenoxyethyl unsubstituted or substituted by 1–5 -chlorine atoms, benzyl, α-phenylethyl, β-phenylethyl, γ-phenyl-n-propyl, cyclohexyl, cyclohexyl-$C_1$–$C_2$-alkyl, $T^2$ is unsubstituted $C_1$–$C_5$-alkyl, β-cyanoethyl, β-methoxyethyl, β-ethoxyethyl, β-n-butoxyethyl, β-chloroethyl, β-bromoethyl, β-carbamoylethyl, β-methoxycarbonylethyl, β-ethoxycarbonylethyl, β-carboxyethyl, β-hydroxyethyl, β-acetoxyethyl, β-methoxycarbonyloxyethyl, benzyl, β-phenylethyl, γ-phenyl-n-propyl, β-phenoxyethyl or ethylene connected to the 8-position of the coumarin.

4. Monomethine dyestuffs of the formula

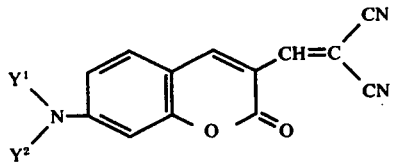

wherein $Y^1$ represents unsubstituted $C_1$–$C_5$-alkyl, phenyl-$C_1$–$C_3$-alkyl, β-chloroethyl, β-cyanoethyl, β-carbamoylethyl, β-$C_1$–$C_2$-alkoxyethyl, β-phenoxyethyl which is optionally substituted by 1–5 chlorine atoms, β-cyclohexyloxyethyl or cyclohexyl, and $Y^2$ represents unsubstituted $C_1$–$C_5$-alkyl, phenyl-$C_1$–$C_3$-alkyl, β-chloroethyl, β-cyanoethyl, β-carbamoylethyl, β-$C_1$–$C_2$-alkoxyethyl or β-phenoxyethyl.

5. The monomethine dyestuff of the formula

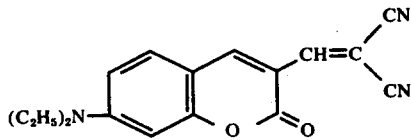

* * * * *